United States Patent [19]
Scheier et al.

[11] 3,802,028
[45] Apr. 9, 1974

[54] METHOD AND APPARATUS FOR USE IN EVISCERATION OF POULTRY
[75] Inventors: Donald J. Scheier, Kansas City, Mo.; Homer A. Haynes, Kansas City, Kans.
[73] Assignee: Gordon Johnson Company, Kansas City, Mo.
[22] Filed: Apr. 10, 1972
[21] Appl. No.: 242,722

[52] U.S. Cl. .................................. 17/45, 17/11
[51] Int. Cl. ............................. A22b 3/00
[58] Field of Search ............. 17/11, 45, 52, 51, 23

[56] References Cited
UNITED STATES PATENTS
| | | | |
|---|---|---|---|
| 3,099,039 | 7/1963 | Ine | 17/51 |
| 3,451,097 | 6/1969 | Knight | 17/11 |
| 3,137,031 | 6/1964 | Ine | 17/51 |

Primary Examiner—Louis G. Mancene
Assistant Examiner—D. L. Weinhold
Attorney, Agent, or Firm—Schmidt, Johnson, Hovey & Williams

[57] ABSTRACT

In the automatic evisceration of poultry, a vacuum scrubber is utilized to detach and extract organs such as lungs and kidneys from sockets in the body cavity of a continuously moving bird, which organs may, for example, have been intentionally left intact during prior stages of the evisceration process in which other organs such as the heart, spleen, gizzard and associated entrails were removed. Scrubbing action is initially concentrated in the lung area of the bird as the vacuum scrubber is reciprocated along its back, and then is concentrated in the kidney area of the bird. A momentary swinging of the scrubber outwardly away from the back of the bird during scrubbing facilitates an inrush of ambient air to aid in extraction of the lungs, and an automatic neck-cracking assembly operates simultaneously with the scrubber during lung and kidney extraction to crack the neck of the bird and sever a portion of the skin associated therewith.

9 Claims, 13 Drawing Figures

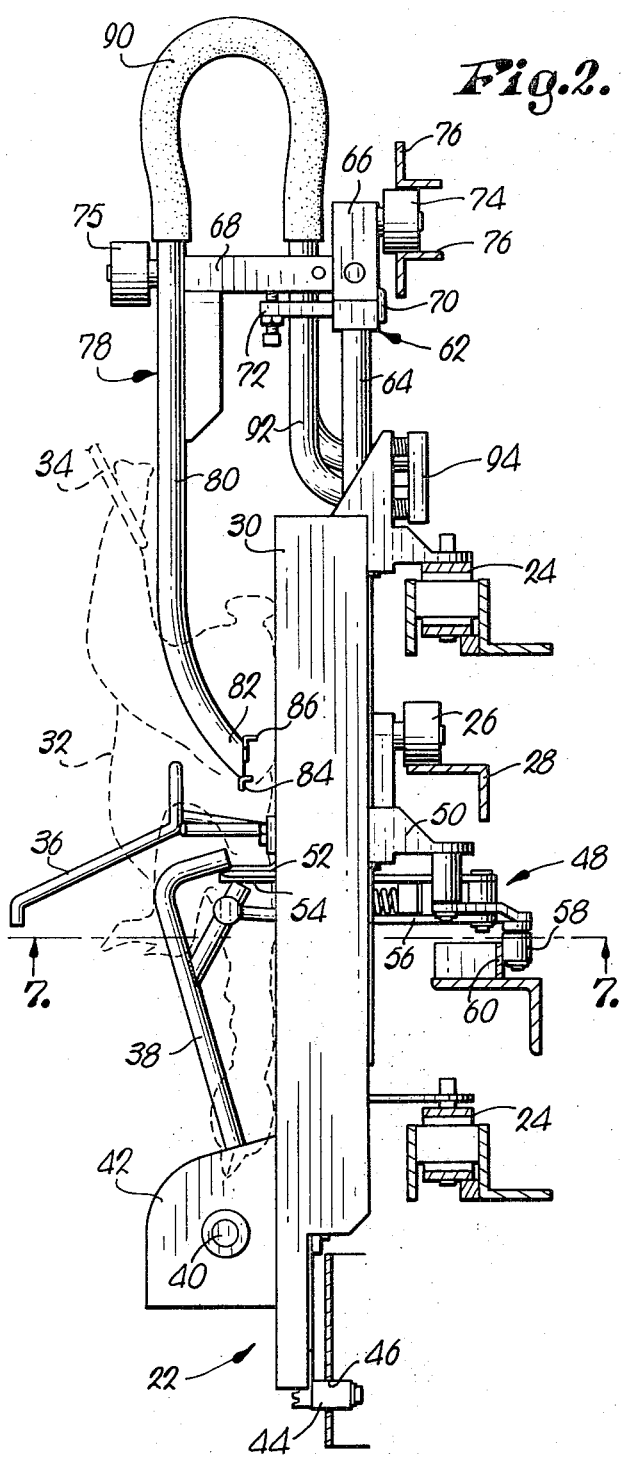
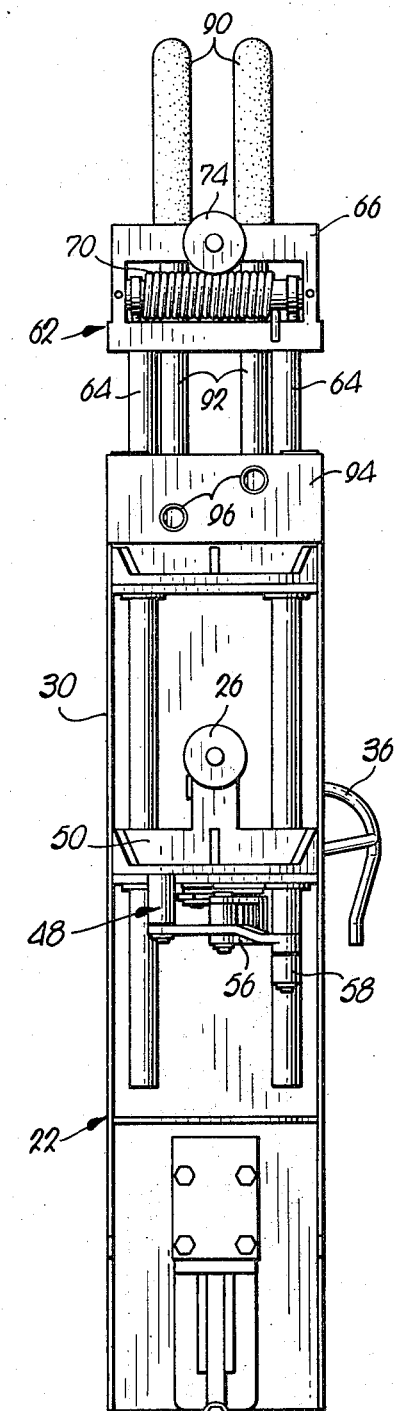
Fig.2.
Fig.3.

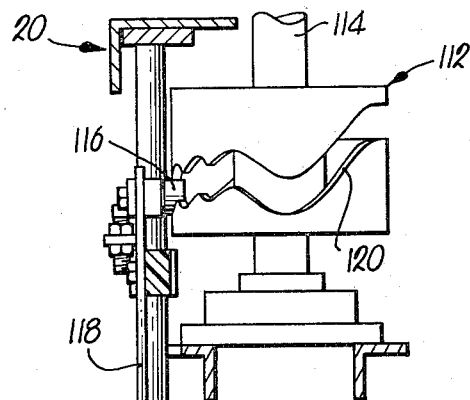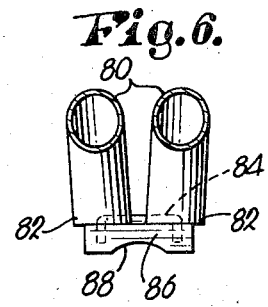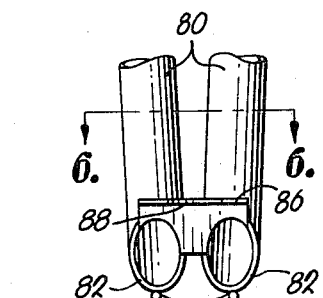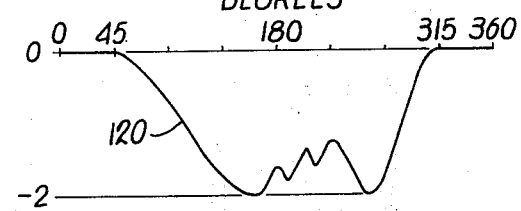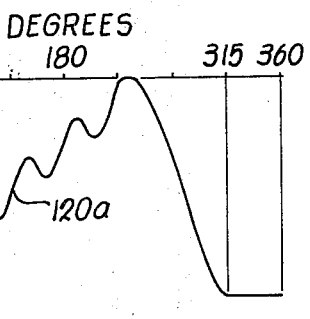

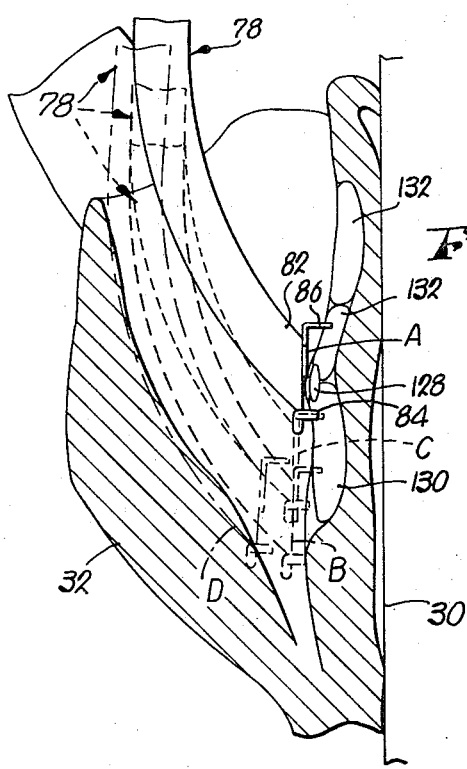
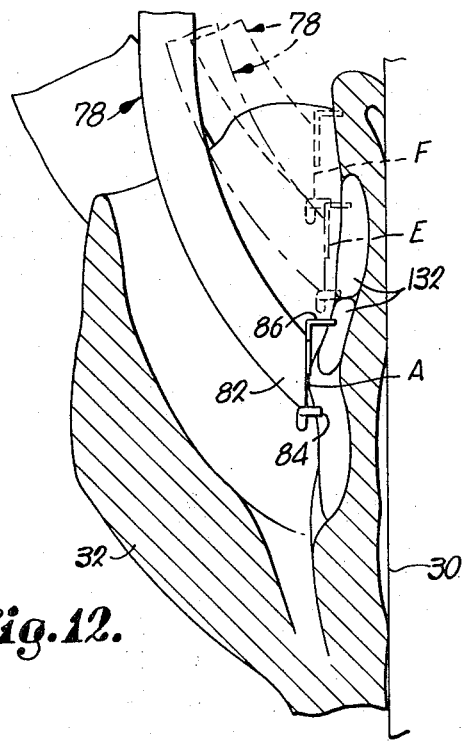
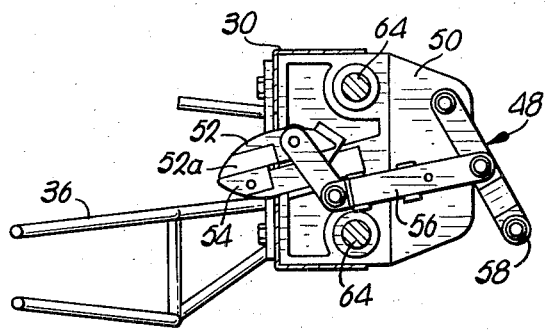
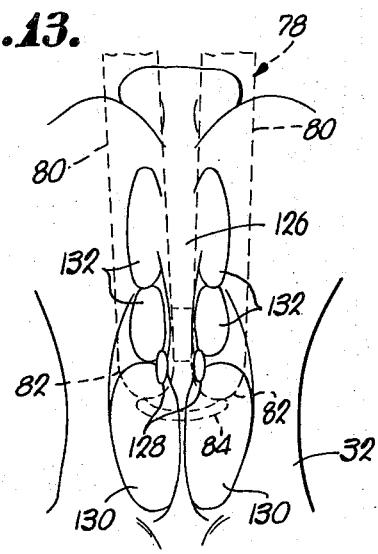
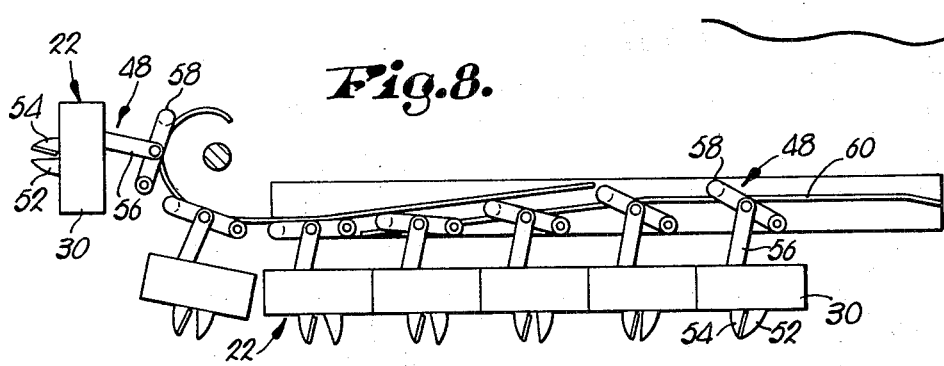

METHOD AND APPARATUS FOR USE IN EVISCERATION OF POULTRY

An important object of the present invention is to provide for high-speed automatic poultry processing in the nature of removing certain difficult-to-extract organs such as the lungs and kidneys of a bird, which organs may have been intentionally or accidentally left intact during previous steps in the evisceration process.

More specifically, it is an important object of the instant invention to provide a poultry processing machine which is capable of performing automatic vacuum scrubbing in the body cavity of a continuously moving bird along the back of the latter for detaching and extracting organs such as lungs and kidneys from their sockets along the backbone of the bird.

Another important object of the invention is the provision of a processing machine as above set forth having successive, individually operable scrubbing stations for the lungs and kidneys respectively of a continuously moving bird such that scrubbing action may be concentrated first in one area while the bird passes the first station and then in the other area as the bird passes the second station, thereby maximizing the operative effectiveness of the vacuum scrubber without decreasing the speed of the processing line.

A further important object of this invention is the provision of means for causing the scrubber to shift momentarily away from the back of the bird during the scrubbing action to facilitate an inrush of ambient air and dislodged material into the scrubber.

Yet another important object of the present invention is to provide an automatic poultry processing machine which simultaneously extracts organs from their sockets in the body cavity of a continuously moving bird and cracks the neck of such bird in preparation for further processing.

In the drawings:

FIG. 2 is an enlarged, fragmentary, cross-sectional view of one of the carriages of the machine taken along line 2—2 of FIG. 1 and showing in phantom a suspended bird on the carriage;

FIG. 3 is a rear elevational view of the carriage in FIG. 2;

FIG. 4 is an enlarged, substantially vertical cross-sectional view of the uppermost regions of one of the carriages and adjacent cam and track structure on the frame of the machine;

FIG. 5 is an enlarged, fragmentary view of the nozzle end of one of the vacuum scrubbers;

FIG. 6 is a cross-sectional view of the scrubber taken along line 6—6 of FIG. 5, illustrating the scrapers of the scrubber;

FIG. 7 is an enlarged, fragmentary, cross-sectional view of the neck-cracking assembly on the carriage taken along line 7—7 of FIG. 2;

FIG. 8 is primarily a diagrammatic view illustrating the sequence of steps in the operation of the neck cracker;

FIG. 9 is a graphic representation illustrating the cam path for the scrubber when the latter is in the lung area of the bird;

FIG. 10 is a representation similar to FIG. 9 showing a second cam path for the scrubber when the latter is in the kidney area of the bird;

FIG. 11 is a cross-sectional view of a bird including a diagrammatic illustration of the scrubber in its various positions during lung extraction;

FIG. 12 is a view similar to FIG. 11 illustrating the scrubber in its various positions during kidney extraction; and FIG. 13 is a plan view showing the initial position of the scrubber after entering the body cavity of the bird.

Figure 1:
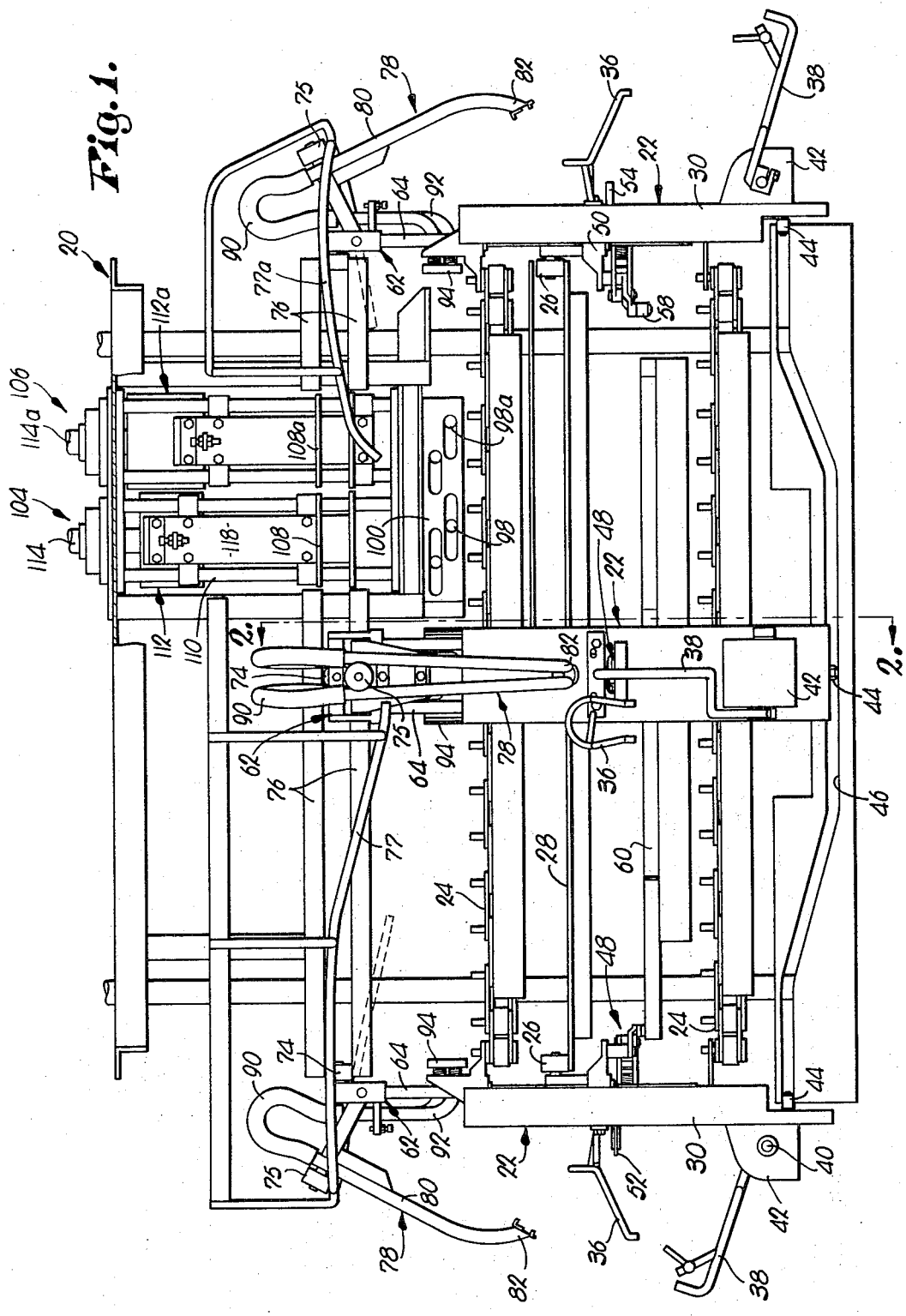
FIG. 1 is a fragmentary, front elevational view of a poultry processing machine made in accordance with the present invention.

The machine of the present invention has a frame 20 (FIG. 1) structurally similar to the frame of the eviscerating machine shown and described in U. S. letters Pat. No. 3,653,093, issued Apr. 4, 1972, and entitled "Poultry Eviscerating Machine." Accordingly, frame 20 has not been shown in detail and the above patent is hereby incorporated by reference into the present specification for a clear and complete understanding of the specific construction of frame 20 as well as for a full understanding of the nature and operation of the machine of said patent.

Frame 20 carries a plurality of shiftable supporting carriages 22 for movement in a closed cycle about the machine by virtue of a pair of vertically spaced conveyor chains 24. A main support roller 26 for each carriage 22 rides along a stationary shelf 28 on frame 20, and each carriage 22 has a formed mounting plate 30 for receiving the back of a carcass such as a bird 32 (FIG. 2) suspended by an overhead conveyor and shackle assembly 34 for movement along a path of travel adjacent that of the carriages 22. A horseshoe-shaped guide rod 36 is supported in cantilever fashion on the plate 30 of each carriage 22 for guiding bird 32 into its proper position, and a swingable holding arm 38 on each plate 30 is pivoted at 40 by mechanism (not shown) within a housing 42. A follower 44 operably coupled with the pivoting mechanism for arm 38 rides in a control slot 46 on frame 20.

A neck-cracking assembly 48 on each carriage 22 (shown in detail in FIG. 7) is supported by a casting 50 on plate 30 and includes a pair of relatively shiftable jaws 52 and 54 operated by a linkage 56. Jaw 54 is fixed to casting 50 while jaw 52 is pivotally secured thereto for movement toward and away from jaw 54 through linkage 56, the latter having a follower 58 operated by an actuating guide 60 (FIGS. 1, 2, 4 and 8) on frame 20.

A head unit 62 is shiftably mounted on each carriage 22 for vertical reciprocation relative to plate 30 by virtue of a pair of upright shafts 64 shiftably carried by casting 50. Each head 62 includes a main block 66 affixed to the upper ends of shafts 64, and a swingable, U-shaped mounting yoke 68 pivotally secured to block 66 for movement about a horizontal axis. A torsion spring 70 interconnecting block 66 and yoke 68 yieldably biases the latter downwardly in a counterclockwise direction viewing FIG. 2 for abutment against a limit stop 72. An inner roller 74 on block 66 moves between a pair of opposed angle bars 76 on frame 20 for controlling reciprocation of head 62, and an outer roller 75 on yoke 68 rides along a cam rod 77 on frame 20 for controlling vertical swinging of yoke 68 against the action of spring 70.

A vacuum scrubbing tool 78 is supported on the outer end of yoke 68 for each carriage 22 and includes a pair of slightly inturned tubes 80 which converge as their lower ends are approached and present a pair of spaced-apart pickup nozzles 82 at such ends. As shown in FIGS. 5 and 6, nozzles 82 have spaced-apart, front and rear scrapers 84 and 86 respectively, scraper 84 being in the form of a generally u-shaped wire member having lowermost ends projecting beyond the tips of nozzles 82, and scraper 86 being in the form of a downwardly projecting flange which spans the rear of nozzles 82. An arcuate relieved portion 88 in scraper 86 is aligned with the open configuration of front scraper 84, both of which are disposed centrally of nozzles 82 for clearing the backbone of the bird being processed as will hereinafter be described in detail.

The opposite ends of tubes 80 are connected via a pair of flexible hoses 90 to a pair of corresponding conduits 92 which lead to a spring-loaded vacuum shoe 94. Shoe 94 has a pair of openings 96 (FIGS. 3 and 4) for conduits 92 which serve to communicate nozzles 82 with corresponding vacuum ports 98 in a stationary manifold 100 on frame 20 for shoe 94, the manifold 100, in turn, being coupled via lines 102 with a source of vacuum pressure (not shown).

Viewing FIG. 1, it may be seen that manifold 100 is limited to the right central portion of the machine extending below a pair of successive processing stations broadly denoted 104 and 106 respectively. Station 104 is especially designed for lung removal and includes a shiftable, horizontally extending track section 108 which is mounted for vertical reciprocation relative to frame 20 along a pair of laterally spaced, upright shafts 110 rigid to frame 20. Track 108 has a normal standby position horizontally aligned with track bars 76 for inner roller 74 and is operated by a shiftable cam 112 rotatably driven on frame 20 by a vertical drive shaft 114, the shaft 114 being operably coupled with a suitable prime mover (not shown). A rotatable follower 116 is disposed at the upper end of a vertically extending support plate 118 for track 108 and rides within a cam path 120 in cam 112 during rotation of the latter.

Station 106 is especially designed for kidney removal and is structurally similar to station 104, with the exception that cam 112a thereof (shown only in FIG. 1) is adapted to impart modified reciprocation to track 108a thereof in a cycle displaced vertically from that of track 108. Cam 112a is rotatably driven by its corresponding shaft 114a to effect reciprocation of track 108a from its normal standby position in horizontal alignment with the adjacent track 108 and with the proximal right-hand end of the continuous track bars 76. However, as shown in FIGS. 9 and 10, the respective cam paths 120 and 120a of cams 112 and 112a differ markedly from one another. At 45° of cam 112 path 120 begins sloping downwardly from its base line corresponding to the normal position of track 108 until reaching its lowermost limit at approximately 135°, whereupon a series of three successive undulations are encountered as path 120 progressively returns toward its base line between approximately 135° and 225°. Path 112 therefor slopes downwardly between 225° and 270° until the lower limit is again reached, whereupon path 120 returns upwardly to its base line between 270° and 315°.

In contrast to path 120, path 120a travels progressively upwardly from its base line corresponding to the normal position of track 108a in a series of five undulations between 45° and approximately 230° of cam 112a, whereupon path 120a then progressively returns to its base line as 315° of cam 112a is approached.

Note in FIG. 1 that cam rod 77 is discontinuous having an open section across the front of the machine including station 104 and all but the final portion of station 106. In place of rod 77, as shown only in FIG. 4, an outermost stationary guide member 212 for outer roller 75 is provided which is mounted on frame 20 by virtue of a fragmentarily shown, U-shaped mount 124, the member 212 being strategically aligned with station 104 adjacent the path of travel of carriage 22 for controlling swinging of scrubbing tool 78 during this period.

OPERATION

The processing machine of the present invention is especially suited for use in latter stages of the poultry evisceration process, such as following prior removal of the heart, spleen and other organs by the eviscerating machine shown and described in the incorporated patent. As set forth in one version of the machine of said patent, a removal tool, in the nature of a loop, is inserted into the body cavity of a continuously advancing bird along a path extending between the breast of the bird and viscera in the cavity, whereupon viscera are captured by the loop and pulled from the cavity as the loop is withdrawn along the backbone of the bird through the access opening previously cut at its vent. Although yieldable pressure is applied against the backbone of the bird, the lungs and kidneys which lie within relatively deep sockets in the cavity, as well as the sex organs of the bird, are intentionally not removed by the loop at this time. This allows subsequent inspection of withdrawn viscera hanging exteriorly of the bird, as well as inspection of the intact and undamaged lungs, kidneys and sex organs remaining in the body cavity.

After inspection, the continuously moving birds advance toward the left-hand end of the present machine, viewing FIG. 1, and are successively intercepted by corresponding carriages 22 as the latter return from the backside of the machine for travel along the front of the machine. As a bird 32 is intercepted by the guide rod 36 of its corresponding carriage 22 and moved into its proper position with its back against plate 30, the holding arm 38 and scrubbing tool 78 of the carriage 22 simultaneously swing from their outermost positions illustrated at the left end of the machine in FIG. 1 to their innermost positions shown in FIG. 2 and illustrated by the middle carriage 22 in FIG. 1. Tool 78 thus enters the body cavity of bird 32 for subsequent scrubbing operations.

At this time, outer roller 75 leaves cam rod 77 such that nozzles 82 are yieldably held in position against the back of bird 32 at location A shown in FIGS. 11 and 13. In location A, nozzles 82 are disposed on opposite sides of the backbone 126 with scrapers 84 and 86 on opposite upper and lower sides of the sex organs 128. Then, as carriage 22 advances with birds 32 to station 104, inner roller 74 leaves track bars 76 and enters track 108, the latter beginning its operating cycle as shown in FIG. 9 after allowing a sufficient dwell period for roller 74 to completely board the track 108. Simultaneously with the boarding of roller 74 onto track 108, vacuum pressure is supplied to nozzles 82 through manifold 100, and track 108 begins its downstroke to shift nozzles 82 from location A to location B. This initial downstroke and simultaneous suction detaches sex organs 128 for removal through tubes 80 and positions scrapers 84 and 86 on the lungs 130 for the scrubbing, sucking and scraping action which follow as cam 112 reciprocates tool 78. During such reciprocation, nozzles 82 simultaneously scrub and suck lungs 130 to detach and withdraw them while progressively moving upwardly along the back of bird 32 until reaching location C below location A, whereupon cam 112 returns track 108 in a straight downstroke to its lower limit. However, during the final downstroke, the outer guide member 122 (FIG. 4) prevents roller 75 and hence tool 78 from moving downwardly with head 62, thereby swinging nozzles 82 momentarily outwardly from the back of bird 32 into location D which facilitates an inrush of ambient air and dislodged lung material into nozzles 82 for conveyance through tubes 80. Cam 112 then returns track 108 to its normal position aligned with track bars 76 to return nozzles 82 to position A and to prepare for exit of inner roller 74 from track 108 onto track 108a of kidney station 106.

As carriage 22 leaves station 104 and enters station 106, nozzles 82 remain in location A in preparation for reciprocation between the locations illustrated in FIG. 12. Cam 112a then begins to reciprocate track 108a progressively upwardly to its upper limit, causing nozzles 82 to pass successively from location E to location F while scrubbing, sucking and scraping the kidneys 132 from their sockets for withdrawal through tubes 80. After completing the reciprocating, upward stroke, track 108a is returned to its normal position in alignment with the proximal track bars 76, during which downstroke the vacuum to nozzles 82 is shut off and outer roller 75 engages the upwardly inclined stretch 77a of cam rod 77 to initiate outward swinging of tool 78 away from the back of bird 32. As inner roller 74 then enters track bars 76, tool 78 and holding arm 38 are respectively swung out of and away from bird 32 to free the latter for subsequent conveyance by assembly 34 along the processing line.

Referring to FIG. 8, it may be seen that as tool 78 begins its initial entry into the body cavity of bird 32, the neck cracker assembly 48 is progressively actuated by cam guide 60 until jaws 52 and 54 become closed about the neck of bird 32 approximately as carriage 22 approaches station 104. Subsequently, jaws 52 and 54 remain closed during the scrubbing operations performed at stations 104 and 106 to thoroughly crack the neckbone of bird 32. Jaws 52 and 54 also remain closed as bird 32 is pulled from carriage 22 at the right end of the machine such that a portion of the neck skin is severed by a blade 52a on jaw 52. It is important, however, that the esophagus and windpipe of the bird not be severed at this time.

In some instances it may be necessary or desirable to remove only the lungs and sex organs from the birds as they are processed by the instant machine, leaving the kidneys unremoved. In this case it is but necessary to disconnect vacuum pressure to station 106 such as by a suitable valving arrangement (not shown) and, preferably, rendering cam 112a and its drive shaft 114a inoperable to leave track 108 in a stationary condition as roller 74 passes therealong, hence preventing scrubbing of the kidneys. It is also to be noted that additional processing stations over and above stations 104 and 106 may be conveniently added to the machine to perform other scrubbing operations or the like, such as if it is desired to provide more scrubbing time without decreasing the speed of the continuously advancing birds 32 and carriages 22.

Having thus described the invention, what is claimed as new and desired to be secured by letters Patent is:

1. In a method of processing poultry, the automated steps of:
   advancing a number of birds in succession along a conveying line;
   intercepting each of the birds in succession with a moving support therefor;
   mechanically holding each bird on its support against movement in a fore-and-aft extending direction;
   inserting a vacuum scrubbing tool into the body cavity of a bird along a predetermined path of travel to a position overlying viscera in sockets along the back of the bird while the bird continues to be advanced and held;
   pressing said tool against the back of the bird in said position with a predetermined amount of pressure;
   reciprocating the tool longitudinally of the backbone of the bird in a prescribed, mechanically controlled movement while maintaining said pressure whereby to dislodge viscera from such sockets along the backbone;
   shifting said tool outwardly away from the backbone for a predetermined distance and for a predetermined amount of time while maintaining the tool in said position overlying the dislodged viscera whereby to cause an inrush of ambient air and dislodged viscera into the tool; and
   withdrawing the tool from the body cavity along a predefined course of travel after extracting the dislodged viscera from the sockets.

2. In a method as claimed in claim 1, wherein reciprocation of the tool in said lung area is carried out prior to reciprocation of the tool in said kidney area.

3. In a method as claimed in claim 1, wherein is provided the additional step of cracking the neck of the bird simultaneously with reciprocation of the tool.

4. In a method as claimed in claim 1, wherein said pressure is yieldable.

5. In a method as claimed in claim 1, wherein said reciprocation of the tool is carried out in the lung area of the bird, and wherein is provided an additional series of reciprocating strokes of the tool in the kidney area of the bird separate and apart from reciprocation in the lung area.

6. In a method of processing a suspended bird having an access opening cut to the body cavity thereof, the automated steps of:
   advancing the suspended bird along a predetermined path of travel;
   supporting the back of the bird as it is advanced;
   holding the advancing bird against upward movement;
   inserting a removal tool into said cavity through said opening along a path extending between the viscera and the breast of the bird;
   capturing viscera exclusive of the lungs and kidneys in the inserted tool;
   moving the tool upwardly along the back of the bird longitudinally of its backbone toward said opening as the bird continues to advance, thereby pulling the captured viscera from the cavity;

inspecting the viscera pulled from the cavity as the bird continues to advance;

inserting a vacuum scrubbing tool into the cavity to a position against the back of the bird as the latter continues to advance; and reciprocating the scrubbing tool longitudinally of the backbone in the lung area of the cavity while retaining the tool in said position and while the bird continues to advance to thereby scrub and extract the lungs from their sockets along the backbone.

7 In a method as claimed in claim 6, wherein is provided the additional step of reciprocating the tool longitudinally of the backbone in the kidney area of the cavity after extraction of the lungs while retaining the tool in said position and while the bird continues to advance to thereby scrub and extract the kidneys from their sockets along the backbone.

8. In a method as claimed in claim 6, wherein is provided the additional step of shifting the tool momentarily out of said position away from the back of the bird during reciprocation of the tool in said lung area.

9. In a method as claimed in claim 6, wherein is provided the additional step of cracking the neck of the bird simultaneously with reciprocation of the tool in said lung area.

* * * * *